UNITED STATES PATENT OFFICE.

SAMUEL C. PUNCH, DAVID T. PUNCH, AND JACOB C. PUNCH, OF ST. LOUIS, MISSOURI, ASSIGNORS TO COTTO-WAXO CHEMICAL COMPANY, OF ST. LOUIS, MISSOURI, A CORPORATION OF MISSOURI.

COMPOSITION FOR LAYING, COLLECTING, OR ABSORBING DUST.

944,276.　　Specification of Letters Patent.　　Patented Dec. 28, 1909.

No Drawing.　　Application filed March 15, 1909.　Serial No. 483,506.

*To all whom it may concern:*

Be it known that we, SAMUEL C. PUNCH, DAVID T. PUNCH, and JACOB C. PUNCH, citizens of the United States, residing at the city of St. Louis, State of Missouri, have jointly invented a certain new and useful Improvement in Compounds for Laying, Collecting, or Absorbing Dust, of which the following is a specification.

This invention relates to a certain new and useful improvement in compounds or compositions of matter adapted to be used preferably during the act of sweeping floors, carpets, rugs, or other surfaces for the purpose of laying, collecting, or absorbing the dust and other like particles, the object of our invention being to provide a compound or composition of matter of the kind described which will efficiently lay, settle, collect, or absorb the dust and other like particles upon or from the surfaces upon which it is adapted to be used without smearing, staining, or injuring the said surfaces, and to improve generally upon compounds or compositions of matter of the kind stated.

With this object in view, our invention resides in the novel combination of ingredients or materials entering into and making-up our compound, all as will hereinafter be described and afterward pointed out in the claims.

Our compound or composition of matter consists substantially of preferably fine saw-dust, water, calcium chlorid, sodium chlorid or common salt, preferably pulverized rosin, and an oily substance, such as preferably paraffin oil. In addition to these said ingredients or materials, there may also be added to our compound a quantity of some suitable disinfectant, such as preferably crystallized carbolic acid; a quantity of some suitable antiseptic material, such as preferably synthetic (sassafras) camphor; and also a suitable coloring material, for purposes hereinafter stated.

In preparing our compound or composition of matter, we first obtain from planing mills or other sources ordinary saw-dust, which is sifted or passed through, first, a No. 6 mesh screen and then a No. 10 mesh screen, in order to secure the finer saw-dust, the coarser saw-dust preferably not being used in our compound. To approximately six hundred pounds of this fine saw-dust, we now add approximately two hundred and ten pounds of water, in which there has preferably been previously dissolved approximately an equal amount, that is to say, approximately two hundred and ten pounds, of calcium chlorid. To this mass we next add approximately two hundred and seventy pounds of medium granulated common salt or chlorid of sodium and approximately one hundred and fifty pounds of pulverized rosin. These substances or materials are now placed in any suitable mixing machine, and we then preferably add to the foregoing a small quantity, approximately twelve ounces, of preferably the highest grade crystallized carbolic acid, this carbolic acid having previously been softened in water heated to about 110° F., and also a small quantity, approximately six fluid ounces, of synthetic (sassafras) camphor. The said materials or ingredients are now mixed in the mixing machine for about fifteen minutes, when we then add to the same approximately eighteen gallons of paraffin oil having preferably a specific gravity of 30. The foregoing materials are now thoroughly and intimately mixed and intermingled in said mixing machine for about three-quarters of an hour, when the mass may be removed and put into suitable packages ready for sale, the resulting compound or composition of matter being a granular mass, slightly moist, and one which we have found to be an excellent one for the purposes stated. The saw-dust, calcium chlorid, and sodium chlorid absorb the water and, so wet or moistened, serve mainly to settle the dust and dirt, at the same time giving the compound a substantial body and weight, so that it will not fly, and the calcium chlorid, due to its moisture-absorbing qualities, serves further to keep the compound continually moist. The rosin is thoroughly diffused throughout the mixture and carried mainly by the saw-dust, and the saw-dust, so carrying the rosin, serves also to collect or absorb the dust and dirt, while the paraffin oil, which is also thoroughly diffused throughout the mixture, not only serves to increase the dust-collecting or absorbing qualities of the mixture, but also serves to prevent the mixture from becoming caked or lumpy.

The carbolic acid or other disinfectant and the camphor or other antiseptic material which may be employed in our compound make the act of sweeping with our compound practically sanitary and antiseptic.

Our compound is adapted to be placed in thin lines across the surface to be swept, and due to the combined physical properties of the several ingredients entering into our composition and the co-acting of said ingredients together, we have found our composition to be most efficient in laying, settling, and collecting the dust, dirt, and other like particles without staining, smearing, or injuring the fabrics or surfaces upon which it may be used, the act of sweeping with our compound being rendered practically dustless, antiseptic, and sanitary, and, at the same time, the carpets, rugs, or other fabrics on which our compound may be placed being preserved and brightened. If desired, while the mass is in the mixing machine, a small quantity of any suitable coloring matter may be added thereto, such as approximately twelve ounces of green, red, or other aniline coloring matter, previously dissolved in wood alcohol. This coloring matter will also be thoroughly distributed throughout the mass in the mixing machine, and, other than giving our compound or composition of matter the color desired, it will in no way affect our compound or the properties thereof or the surfaces upon which our compound may be used.

While we have been particular to set forth approximately the exact proportions of the said several ingredients or materials entering into our compound and the manner of mixing and intermingling the same, yet it will be understood that said proportions of said materials, as well as the manner of mixing the same, may be varied without departing from the nature of our invention.

Having thus described our invention, what we claim and desire to secure by Letters Patent is:

1. The composition of matter herein described, the same having as its base fine sawdust and comprising, in addition thereto, water, calcium chlorid, sodium chlorid, rosin, and paraffin oil; substantially as described.

2. The composition of matter herein described, the same having as its base fine sawdust and comprising, to every six hundred pounds of said saw-dust, two hundred ten pounds of water, two hundred ten pounds of calcium chlorid, two hundred seventy pounds of sodium chlorid, one hundred fifty pounds of pulverized rosin, and eighteen gallons of paraffin oil having a specific gravity of 30, all said ingredients being thoroughly mixed and intermingled, substantially as described.

In testimony whereof, we have signed our names to this specification, in the presence of two subscribing witnesses.

SAMUEL C. PUNCH.
DAVID T. PUNCH.
JACOB C. PUNCH.

Witnesses:
CARREL F. RHODES,
SHEPARD R. EVANS.